March 26, 1968     R. E. POWERS     3,374,883
STICK OF FASTENERS FOR MAGAZINE SUPPLY
Filed Feb. 7, 1966
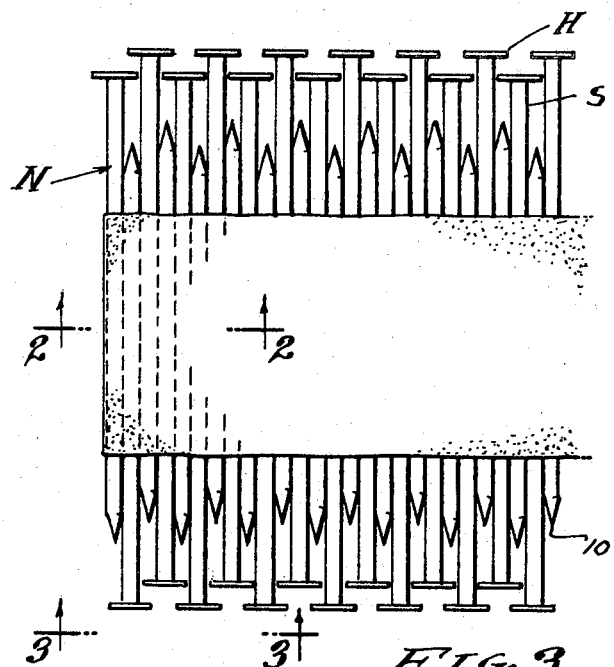
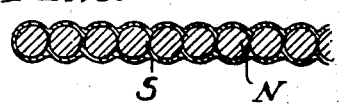
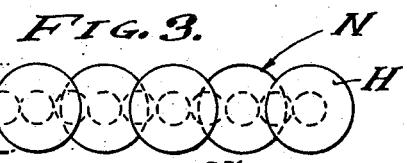
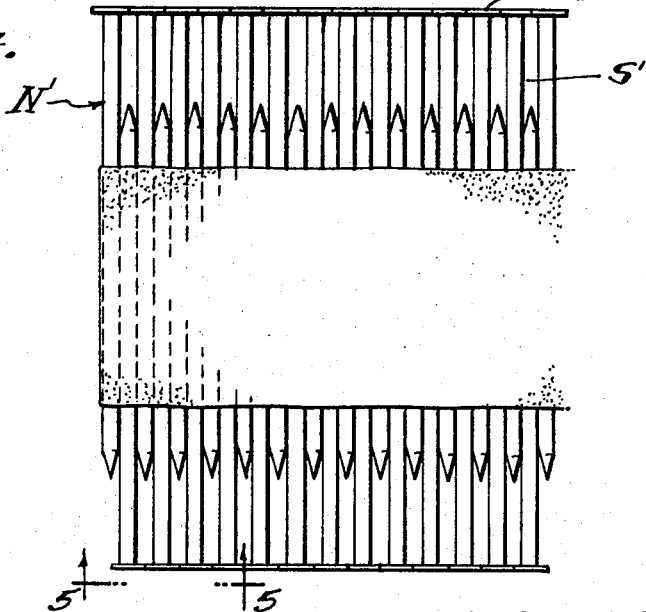
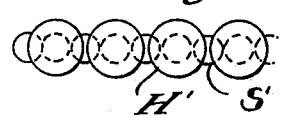
INVENTOR.
RICHARD E. POWERS
BY
AGENT

United States Patent Office 3,374,883
Patented Mar. 26, 1968

3,374,883
STICK OF FASTENERS FOR MAGAZINE SUPPLY
Richard E. Powers, San Marino, Calif., assignor to Powers Wire Products Co., Inc., El Monte, Calif., a corporation of California
Filed Feb. 7, 1966, Ser. No. 525,669
8 Claims. (Cl. 206—56)

This invention relates to fasteners that are adapted to be deployed from power operated tools and is particularly concerned with the condensed storage of fasteners within a magazine supply, it being a general object of this invention to provide for storage of a maximum quantity of fasteners which have unaltered heads.

The art which relates to fasteners and tools for driving the same is characterized by elongated headed fasteners adapted to be stored in a magazine for their subsequent and successive driving engagement by power operated means of the tool. Both the fasteners and the driving tools therefor vary widely; however, a common feature in almost every situation is the elongated and headed fastener. For example, a fastener which is most widely employed is the "common nail" or the like, and it is fasteners of this general type to which the present invention is particularly directed. Consequently, the fastener/nail to be considered is to remain absolutely unaltered in practicing the invention, while storing a maximum number of such aligned nails in a minimum of space within a magazine or like device.

Heretofore, various arrangements of such nails have been proposed ranging from bins of loose nails to sticks thereof with numerous configuration details. The most successful arrangements are those wherein the adjacent nail shanks are coextensively engaged, but such an arrangement normally presents problems in the accommodation of the enlarged nail heads. For example, sticks of such nails have exhibited spaced and parallel shanks whereby the heads clear; or the shanks are convergent so that the heads are accommodated; and they have exhibited adjacent shanks wherein the heads are notched so as to clear. The said spacing of nails requires extra space, the said convergent arrangements impose handling limitations, and the said notching of heads is detrimental to the nail holding capability. Therefore, it is an object of this invention to maintain the desirable parallelism of the nail shanks, to maintain the adjacency of the nail shanks, and to maintain fullness of the nail heads. In other words, it is an object to arrange a multiplicity of nails as closely as possible and without modification to said nails, each nail remaining unaltered with its full head.

It is an object of this invention to provide a stick of nails for insertion into a straight magazine of a power operated tool or the like, and wherein said nails have shanks that engage adjacently and each parallel with the other, there being provision in the arrangement of the same for the accommodation of full nail heads in their unaltered entirety.

It is an object of this invention to provide a stick of headed nails for insertion into a driving tool which is selectively operable to receive and drive successive nails that are alternately disposed in opposite directions when in stick formation. To this end the stick of nails hereinafter disclosed is comprised of a series of nails that are adjacent and oppositely fastened, and which is useful in a driving tool that selectively operates to uniformly drive said nails in a predetermined directional alignment.

The various objects and features of this invention will be fully understood from the following detailed description of the typical preferred forms and applications thereof, throughout which description reference is made to the accompanying drawings, in which:

FIG. 1 is a view of the combination and arrangement of fasteners as they are provided for in the first form of the invention, and FIGS. 2 and 3 are views taken as indicated by lines 2—2 and 3—3 on FIG. 1.

FIG. 4 is a view of the combination and arrangement of fasteners as they are provided for in the second form of the invention, and FIG. 5 is a view taken as indicated by line 5—5 on FIG. 4.

The fastener herein disclosed is a nail N and will be restricted to such a fastener which has a substantial head H at the driving end of a shank S. The shank is usually round in cross section as it is shown and the head is usually disc-shaped and in a plane normal to the axis of the shank. The terminal end 10 of the shank is usually sharpened as shown. The fastener or nail N is proportioned as a "common nail" in the first form of the invention, in which case the head H is substantially more than twice the diameter of the shank S. However, in the second form of the invention the nail N' is reproportioned, in which case the head H' is not more than twice the diameter of the shank S'. In the first form of the invention the head of the nail remains virtually unmodified and as it occurs in any "common nail," while in the second form of the invention the head of the nail is of reduced diameter so as to eliminate a feature required of the said first form, all as hereinafter disclosed.

Referring to both forms of this invention, the nails are combined adjacently side by side with their shanks bearing one against the other, preferably although not necessarily in touching engagement. Further, in both forms of this invention adjacent nails are oppositely disposed with their axes in a common plane and faced in directions related 180° to each. Thus, an unlimited multiplicity of nails (within a practical limit) can be arranged in belted or stick formation, all parallel and in paired adjacent alignment. That is, all nails fastened in a given direction are aligned.

In FIGS. 1, 2 and 3, I have shown the first form of this invention wherein unaltered "common nails" N are arranged in stick formation for storage of a maximum successively arranged quantity and for accurate alignment in the magazine of a driving tool (not shown). In accordance with this invention the axes of the nails N are disposed in a common plane and each adjacent nail shank S is faced oppositely with respect to the other, and each adjacent nail shank S is offset longitudinally with respect to the other, thereby to space the heads H from the next adjacent terminal ends 10. Accordingly, the head H of one nail N is offset so as to clear the terminal end 10 of the next adjacent nail, more than ample clearance being illustrated in the drawings.

A feature of the first form of the invention is the alternate longitudinal offset of every other adjacent nail in each alignment of the nails N faced in a given direction. That is, every other nail is faced in a given direction so as to establish a general alignment, and the nails in said alignment are alternately offset with respect to their parallel placement. This feature is for the accommodation of the "common nail" heads H of somewhat more than twice the diameter of the shanks S, and in this respect the adjacent heads of the spaced nails overlap, preferably with the ample clearance as is shown. As a result, the heads H are clear and free of the shanks S, and the adjacency of the straight shanks can be reliably employed for establishing accurate parallelism in the multiplicity of nails with consequent straightness of the belt or stick formed thereof.

In FIGS. 4 and 5 I have shown the second form of this invention wherein the head H' of the nail N' is of reduced diameter, not to exceed twice the diameter of the shank S' Such a nail has utility where "common nails" or larger headed nails are not required. A feature of this second form is the establishment of the first mentional alignment, wherein the nails are arranged adjacently side by side and are oppositely disposed with their axes in a common plane. Further, the said alignment of oppositely faced nails is virtually undisturbed inasmuch as the reduction of head diameter as specified avoids interference with other nail heads in said alignment. To this end, in avoiding touching engagement of heads with each other and/or with the shanks, the offset feature in each alignment of nails is replaced by the specified limit imposed upon the head diameter.

The general configuration of the nail combination of both forms of the invention is that of a belt or stick, there being means to maintain said orientation of the plurality of nails holding them together and interconnected as by means of adhesive material or a continuous body thereof, at one or at opposite sides, thereby producing the "belt" or "stick" comprised of a plurality of nails N and/or N'. In carrying out this invention the adhesive or interconnecting material, in the form of the continuous body, can be flexible or rigid as circumstances require, in order to establish a "belt" or "stick" as desired.

From the foregoing it will be seen that the straight elongate shanks of alternately opposite faced nails are readily aligned as shown and described, resulting in a straight belt or stick of fasteners. In the first form of the invention the heads H of more than twice the diameter of the shanks S are accommodated without alteration of any kind, making possible the formation of sticks of "common nails" all without the imposition of special features. In the event that heads of lesser diameter than a common nail are preferred, then the second form of the invention is practiceable for the utility of nails with heads H' not to exceed twice the diameter of the shanks S'. It is to be understood that fastener driving tools having suitable magazines and suitable fastener selection and separating means be employed in the handling of these belts or sticks of fasteners characterized by the alternately opposite facement of adjacent nails.

Having described only typical preferred forms and applications of my invention I do not wish to be limited or restricted to the specific details herein set forth, but wish to reserve to myself any modifications or variations that may appear to those skilled in the art and fall within the scope of the following claims.

Having described my invention, I claim:

1. A straight elongated and substantially rigid stick comprising a multiplicity of separably interengaged fasteners and wherein each fastener comprises an elongated axially disposed shank with an enlarged head concentric with the axis at one end, the axes of said multiplicity of fasteners being disposed in a common plane and the shanks of each successive fastener being adjacent and parallel and engaged one with the other, the adjacent fasteners being oppositely faced, and each adjacent fastener being offset longitudinally along its axis with respect to the other thereby to space the heads thereof from the next adjacent shank, and there being means separately interconnecting the adjacently engaged shanks of the fasteners.

2. The stick of fasteners as set forth in claim 1 and wherein the offset of the oppositely faced fasteners is in two alignments with all fasteners faced in a given direction being aligned with each other.

3. The stick of fasteners as set forth in claim 1 and wherein the heads of the fasteners are not more than twice the size of the shanks.

4. The stick of fasteners as set forth in claim 1, wherein the offset of the oppositely faced fasteners is in two alignments with all fasteners faced in a given direction being aligned with each other, and wherein the heads of the fasteners are not more than twice the size of the shanks.

5. The stick of the fasteners as set forth in claim 1, wherein the offset of the oppositely faced fasteners is in two general alignments with all fasteners faced in a given direction being aligned with each other, and wherein the fastener shanks are round and the heads of the fasteners in each general alignment are alternately offset with respect to their axial placement.

6. The stick of fasteners as set forth in claim 1, wherein the heads of the fasteners are more than twice the size of the shank thereof, wherein the offset of the oppositely faced fasteners is in two general alignments with all fasteners faced in a given direction being aligned with each other, and wherein the heads of the fasteners in each general alignment are alternately offset with respect to their axial placement.

7. The stick of fasteners as set forth in cliam 1, wherein the heads of the fasteners are not more than twice the size of the shanks thereof, and wherein the heads of the fasteners in each general alignment are alternately offset with respect to their axial placement and overlapped, one head with the alternately adjacent head.

8. The stick of fasteners as set forth in claim 1, wherein the heads of the fasteners are more than twice the size of the shanks thereof, wherein the offset of the oppositely faced fasteners is in two general alignments with all fasteners faced in a given direction being aligned with each other, and wherein the heads of the fasteners in each general alignment are alternately offset with respect to their axial placement and overlapped, one head with the alternately adjacent head.

References Cited

UNITED STATES PATENTS

| | | | |
|---|---|---|---|
| 1,046,665 | 12/1912 | Smith | 206—56 |
| 2,590,358 | 3/1952 | Williams | 206—56 |

JOSEPH R. LECLAIR, *Primary Examiner.*

THERON E. CONDON, *Examiner.*

J. M. CASKIE, *Assistant Examiner.*